United States Patent [19]

Londeck et al.

[11] Patent Number: 4,869,549

[45] Date of Patent: Sep. 26, 1989

[54] LATCH MECHANISM FOR REMOVABLE ROOF CLOSURE

[75] Inventors: Londeck, Troy; Dale L. Novak, West Bloomfield; Vincent Wood, Sterling Heights, all of Mich.

[73] Assignee: General Motors Corporation, Detroit, Mich.

[21] Appl. No.: 284,014

[22] Filed: Dec. 14, 1988

[51] Int. Cl.$^4$ ............................................. B60J 7/19
[52] U.S. Cl. .......................... 296/224; 292/DIG. 5; 292/DIG. 55; 292/DIG. 73; 296/218
[58] Field of Search ............... 296/218, 224, 120.1, 296/121; 292/DIG. 5, DIG. 73, DIG. 56, DIG. 55, 341.12, 39

[56] References Cited

U.S. PATENT DOCUMENTS

| | | | |
|---|---|---|---|
| 1,947,524 | 2/1934 | Horldt | 292/DIG. 55 X |
| 4,193,618 | 3/1980 | Lee et al. | 292/7 |
| 4,767,154 | 8/1988 | Okamoto et al. | 296/218 |

Primary Examiner—Dennis H. Pedder
Attorney, Agent, or Firm—Charles E. Leahy

[57] ABSTRACT

An improved roof panel latch mechanisms of the type in which a latch bolt is selectively retractable and extendible from a roof closure panel to respectively engage and disengage an end portion of the latch bolt in the bolt receiving aperture of a keeper mounted on a vehicle body. A sleeve, preferably of plastic material, is slidably mounted on the end portion of the latch bolt and has a tapered end. A spring acts between the latch bolt and the sleeve to bias the sleeve in the direction toward engagement with the keeper. The keeper has a tapered surface engageable by the spring biased sleeve so that the tapered end of the sleeve engages with the tapered surface of the keeper to establish a rattle-free relationship between the latch bolt and the keeper. The latch bolt extends further beyond the sleeve and into the keeper.

5 Claims, 1 Drawing Sheet

LATCH MECHANISM FOR REMOVABLE ROOF CLOSURE

The invention relates to a latch mechanism for a removable roof closure and more particularly provides an improved latching relationship between a retractable latch bolt and a body mounted keeper.

BACKGROUND OF THE INVENTION

It is well known in automotive vehicle bodies to provide a roof opening having a removable closure panel. One such well known removable roof structure is shown in U.S. Pat. No. 2,556,062 issued to Gordon M. Buehrig, June 5, 1951. The vehicle body includes a central spine or backbone which extends from the fixed rearward roof portion to the windshield header to stiffen the vehicle roof structure and define separate roof openings over the driver and over the front seat passenger. The inboard portion of each roof closure panel is retained in the roof opening by mating male/female connectors provided respectively on the central spine of the roof and on the removable closure panel. The outboard portion of the removable closure panel is attached to the vehicle body roof by a pair of sliding bolts engageable with keepers mounted respectively on the rearward roof portion and on the windshield header.

It is also known to provide a central operating handle for simultaneously operating sliding latch bolts at the forward and rearward ends of the closure panel. One such patent is U.S. Pat. No. 4,193,618 issued to Charles H. Lee et al, March 18, 1980.

SUMMARY OF THE INVENTION

The present invention relates to an improvement in the aforedescribed latch mechanisms for roof closure and more particularly provides improved rattle-free latching.

The invention relates to an improvement in roof panel latch mechanisms of the type in which a latch bolt is selectively retractable and extendible from a roof closure panel to respectively engage and disengage an end portion of the latch bolt in the bolt receiving aperture of a keeper mounted on a vehicle body. A sleeve, preferably of plastic material, is slidably mounted on the end portion of the latch bolt and has a tapered end. A spring acts between the latch bolt and the sleeve to bias the sleeve in the direction toward engagement with the keeper. The keeper has a tapered surface engageable by the spring biased sleeve so that the tapered end of the sleeve engages with the tapered surface of the keeper to establish a self-centering rattle-free relationship between the latch bolt and the keeper. The latch bolt extends further beyond the sleeve and into the keeper.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
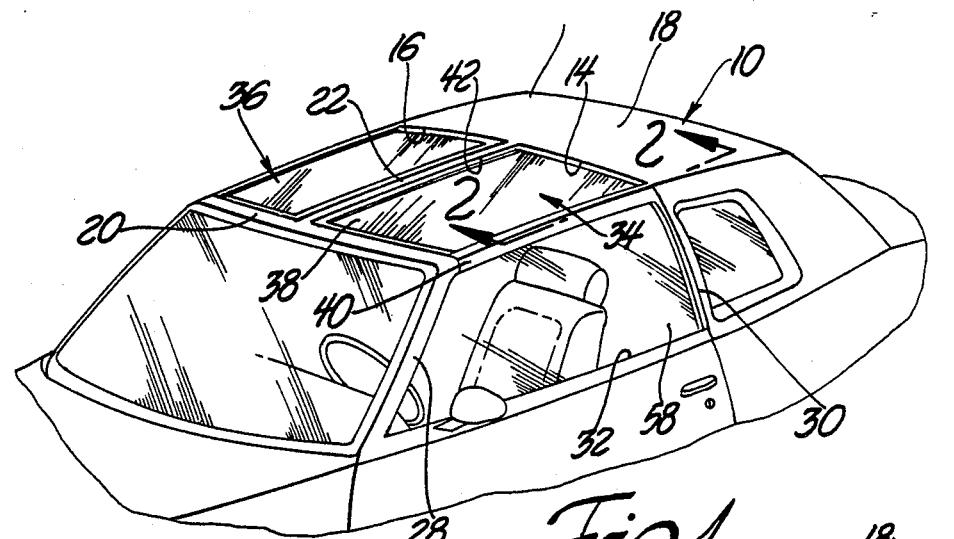
FIG. 1 is a perspective view of a vehicle body having a roof closure panel according to the present invention.

Referring to FIG. 1, it is seen that a vehicle body 10 includes a roof structure 12 having a roof opening 14 located generally above the driver seat and a roof opening 16 located generally above the passenger seat. The roof opening 14 is defined by a fixed rearward roof portion 18, a windshield header 20, and a central spine 22 which extends between the fixed rearward roof portion 18 and the windshield header 20. The driver's door 26 cooperates with the windshield pillar 28 and rear pillar 30 to define a window opening 32 which communicates with the roof opening 14 so that the driver enjoys open space to the side and above. A removable roof closure 34 is provided to close the roof opening 14. A like closure panel 36 is provided to close the roof opening 16.

Figure 2:
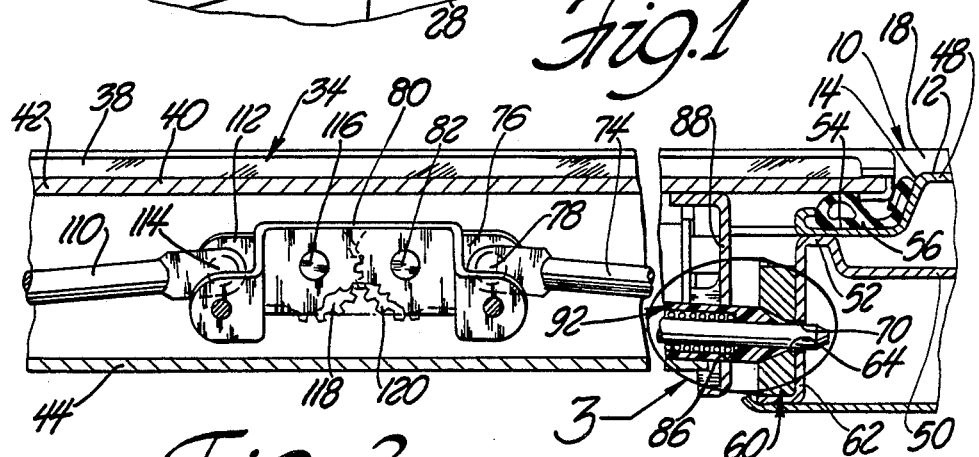
FIG. 2 is a sectional view taken in the direction of arrows 2—2 of FIG. 1.

Referring to FIG. 2, it is seen that the closure panel 34 is generally comprised of a transparent panel 38 having a support channel 40 along its outboard edge and including an upper web 42 and a lower web 44.

Referring again to FIG. 2, it is seen that the fixed rearward roof portion 18 includes an outer panel 48 and an inner panel 50 suitably welded together at 52. The outer panel 48 defines a channel 54 which seats a weatherstrip 56 upon which the closure panel 34 rests. The central spine 22 and the windshield header 20 are similarly constructed of inner and outer panels and seat similar weatherstrips for supporting the closure panel 34.

Mating male and female connectors, not shown in the drawings, are provided between central spine 22 and the channel 42 at the inboard portion of the closure panel 36. These connectors are in turn engaged during transverse sliding movement of the closure panel 34 into the roof opening 14 to retain the inboard portion of the closure panel 34 on the roof structure 12.

Figure 3:
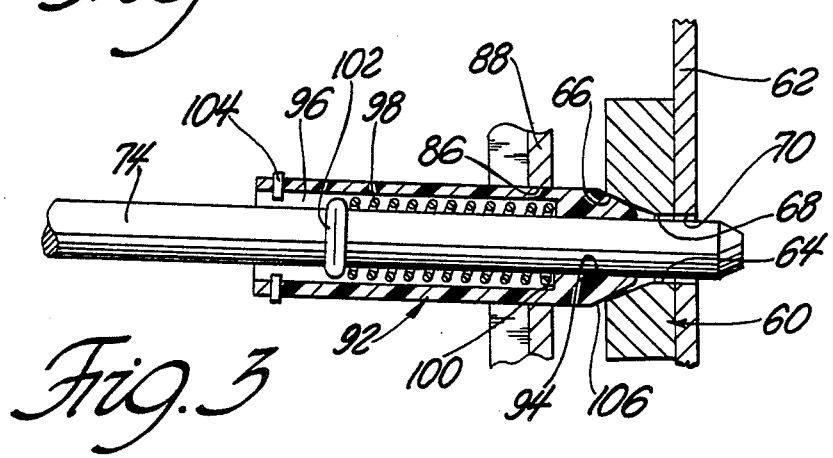
FIG. 3 is an enlarged fragmentary view of FIG. 2.

Referring to FIG. 2, it is seen that the latch mechanism for maintaining the closure panel 34 in its latched position of FIG. 1 includes a keeper 60 which is attached to a downwardly depending flange structure 62 of the roof inner panel 50. As best seen in FIG. 3, the keeper 60 has an aperture 64 therethrough. The aperture 64 includes a conically tapered portion 66 which communicates with a hole portion 68. The flange 62 of the roof inner panel 50 also has a hole 70 which aligns with the hole portion 68 of the keeper aperture 64. The keeper 60 is attached to the flange by screws or other conventional attachment means, not shown. Reference may be had to United States Pat. No. 4,193,618, issued Mar. 18, 1980, Lee et al, for a further description of the attachment of the keeper 60.

As seen in FIG. 2, a latch bolt 74 is carried by the roof closure 34. One end of the latch bolt 74 is connected to a lever 76 by a pivot 78. The lever 76 is in turn mounted on a mounting bracket 80 by a pivot 82. Mounting bracket 80 is attached to the support channel 40. As best seen in FIGS. 2 and 3, the other end of the latch bolt 74 extends through a guide aperture 86 in a bracket 88 attached to the support channel 40.

A sleeve 92, which is a tubular member preferably of molded plastic encircles the latch bolt 74. A bore 94 through the sleeve 92 is slidable upon the latch bolt 74. An annular cavity 96 is defined between the sleeve 92 and the latch bolt 74 and receives a coil compression spring 98. One end of the coil spring 98 is seated against a shoulder 100 of the sleeve. The other end of the coil compression spring is seated against a flange 102 carried by the latch bolt 74. The spring 98 acts to urge the sleeve 92 in the direction toward the keeper 60. A retaining ring 104 carried by the sleeve 92 is engageable with the flange 102 to limit the extent of movement of the sleeve 92 by the spring 98. The end of the sleeve 92 has a conical surface 106 which preferably has the same angle of taper as the tapered portion 66 of the keeper aperture 64.

FIGS. 2 and 3 of the drawings show the latch mechanism in the latched position. The pivotal lever 76 has a substantially straight line relationship with the latch bolt 74 causing the latch bolt 74 to be extended through the keeper 60. The coil compression spring 98 acts to urge the sleeve 92 toward the keeper 60 so that the conical surface 106 of the sleeve 92 is engaged with the tapered portion 66 of the keeper aperture 64. The latch bolt 74 extends completely through the keeper 60 and through the hole 70 of the roof inner panel 62. As best seen in FIG. 3, the self-centering position of the plastic sleeve 92 between the latch bolt 74 and the keeper 60 provides a rattle-free connection, particularly as the spring 98 functions to continuously bias the sleeve 92 rightwardly into conical mating contact with the keeper 60.

When it is desired to unlatch the latch mechanism to remove the roof closure 34, an operating handle, not shown, is pivoted to rotate the lever 76 downwardly from the position of FIG. 2, thereby withdrawing and retracting the latch bolt 74 in the leftward direction as viewed in FIGS. 2 and 3. As the latch bolt 74 is withdrawn, the flange 102 of latch bolt 74 engages with the retaining ring 104 with the sleeve 92 to retract the sleeve 92 leftwardly and thereby carry its conical surface 106 away from engagement with the tapered portion 66 of the keeper aperture 64. In the fully retracted position, both the latch bolt 74 and the sleeve 92 are fully withdrawn from any interference with the keeper 60, thereby permitting the closure panel 34 to be lifted from the vehicle.

Referring again to FIG. 2, it is seen that an additional latch bolt 110 is provided which is associated with a keeper, not shown, to latch the front end of the closure panel 34 to the windshield header 20. The latch bolt 110 is pivotally mounted to a lever 112 by a pivot 114. The operating lever 112 is connected to the mounting bracket 80 by pivot 116. Gear teeth 118 and 120 are provided respectively on the levers 112 and 76 so that rotation of the operating handle, not shown, simultaneously rotates both the operating levers to simultaneously extend or retract the latch bolts 74 and 110.

Thus it is seen that the invention provides a new and improved latch mechanism for a motor vehicle removable roof closure panel.

The embodiments of the invention in which an exclusive property or privilege is claimed are defined as follows:

1. An improved roof panel latch mechanism of the type in which a latch bolt is selectively retractable and extendible from a roof closure panel to engage and disengage an end portion of the bolt in the bolt receiving aperture of a keeper mounted on a vehicle body, wherein the improvement comprises:
    a sleeve slidably mounted on the end portion of the latch bolt and having a tapered end;
    spring means acting between the latch bolt and the sleeve to bias the sleeve toward engagement with the keeper;
    and said keeper having a tapered surface engageable by the spring biased sleeve whereby the tapered end of the sleeve engages the tapered surface of the keeper to wedge the latch bolt into the keeper.

2. The improvement of claim 1 further characterized by the relationship between the latch bolt and the sleeve being such that the latch bolt reaches further toward the keeper than the sleeve.

3. The improvement of claim 2 further characterized by the relationship between the latch bolt, the sleeve and the keeper is such that the aperture of the keeper is larger than the diameter of the latch bolt and the interaction of the tapered end of the sleeve with the tapered surface of the keeper locates the latch bolt within the aperture of the keeper.

4. The improvement of claim 1 in which the tapered end of the latch bolt is a truncated conical taper and the tapered surface of the keeper is a conical tapered wall defining at least of portion of the aperture of the keeper.

5. The improvement of claim 1 in which the sleeve is constructed of a plastic material to reduce the incidence of rattles.

* * * * *